July 24, 1962 J. F. WOOD ET AL 3,046,481
TACHOMETER
Filed Feb. 13, 1958 2 Sheets-Sheet 1

Inventors
John F. Wood
Jon C. Wirth
Graf, Nieman & Burmeister
Attorney

July 24, 1962  J. F. WOOD ET AL  3,046,481
TACHOMETER
Filed Feb. 13, 1958  2 Sheets-Sheet 2
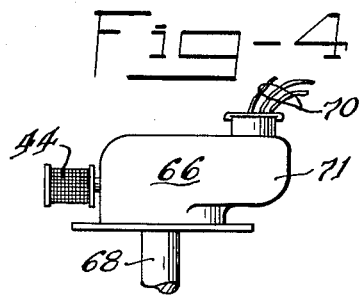
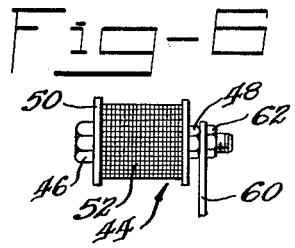
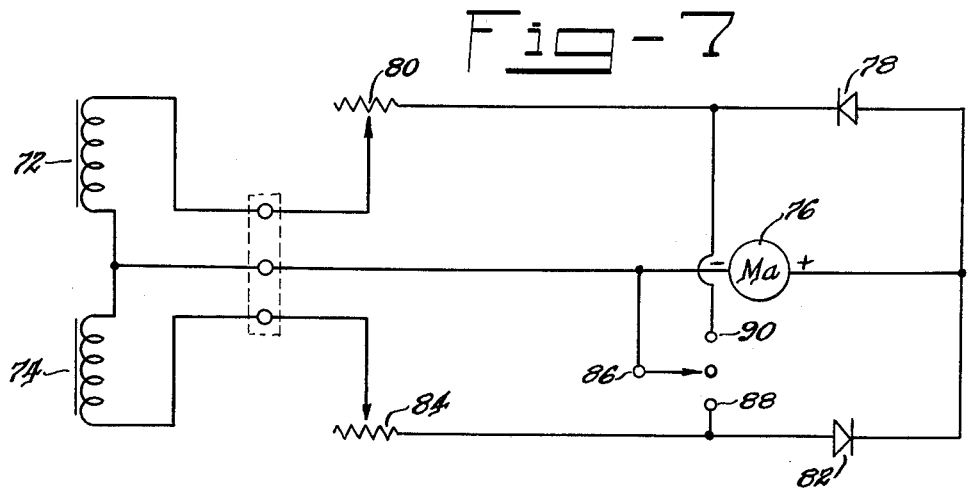
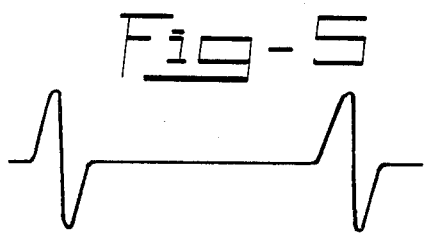
Inventors
John F. Wood
Jon C. Wirth
By: Graf, Nierman & Burmeister
Attorneys

United States Patent Office 3,046,481
Patented July 24, 1962

3,046,481
TACHOMETER
John F. Wood, Buchanan, and Jon C. Wirth, Three Oaks, Mich., assignors to Electro-Voice, Incorporated, Buchanan, Mich., a corporation of Indiana
Filed Feb. 13, 1958, Ser. No. 715,031
8 Claims. (Cl. 324—69)

The present invention relates generally to tachometers for determining the rotation rate of a motor, and more specifically to tachometers for internal combustion engines with ignition systems employing magnetos.

In the past, electrical tachometers required power sources, and generally this requirement was satisfied by an independent power source. Prior attempts to utilize the ignition system of an internal combustion motor for generating an indication of the rotation rate of the motor resulted in reduced ignition system potential, and adversely affected the efficiency of the motor. It is one of the objects of the present invention to provide a tachometer to measure the rotation rate of a motor, which requires neither an external power source nor adversely affects the efficiency of the motor.

Broadly, the present invention employs a pickup coil which is mounted adjacent to the orbit of a magnet which is secured to a rotating shaft of the motor. In recent years, internal combustion motors with ignition systems employing magnetos have become widely used, and the magneto system of such motors generally has a magnet secured to the drive shaft of the motor to produce the ignition pulse. In one embodiment of this invention, this magnet is used for the dual purposes of generating the ignition pulse and a pulse in the pickup coil of the tachometer. The amplitude of the pulses produced by the pickup coil are measured by a meter and are proportional to the speed of the motor. Means are also provided to calibrate the response of the meter to the rotation rate of the motor.

Internal combustion motors, which employ magneto ignition systems, have found popularity for portable operation since they are simple, light, and do not require any voltage source. One use of this type of internal combustion motor is the "outboard" motor which is used to propel small boats. In recent years, some boat operators have employed more than one "outboard" motor to provide the desired power, rather than employing a single larger inboard motor. It is a further object of the present invention to provide a tachometer for measuring the rotation rates of a plurality of motors, and also to measure the difference in the rotation rates of the motors.

Further objects and advantages of the present invention will become apparent from a further reading of this disclosure, particularly when viewed in the light of the drawings, in which:

FIGURE 4 is a fragmentary view of another embodiment of the present invention;

FIGURE 5 is a graph showing the time-amplitude characteristic of the pulse produced in the pickup coil;

FIGURE 6 is an elevational view of the pickup coil and mounting means therefor constructed according to the teachings of the present invention; and FIGURE 7 is an electrical circuit diagram of another embodiment of the present invention in which the tachometer measures the rotation rates of two motors.

Figure 1:
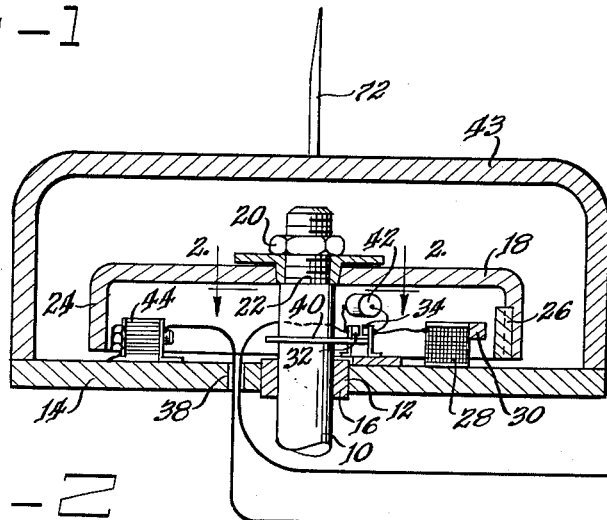
FIGURE 1 is a fragmentary sectional view of an internal combustion motor, and includes an electrical circuit diagram of the ignition system of the motor and a tachometer constructed according to the teachings of the present invention.
Figure 2:
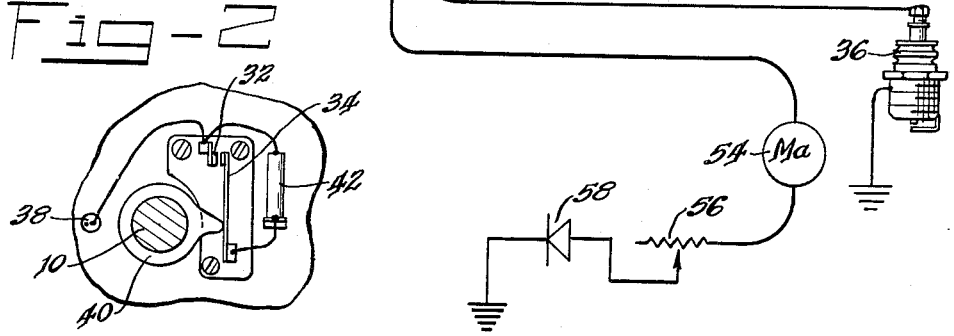
FIGURE 2 is a fragmentary sectional view taken along the line 2—2 of FIGURE 1.

As illustrated in FIGURE 1, the internal combustion motor, whose rotation rate is to be measured, has a shaft 10 which either is itself the motor drive shaft or is coupled to the drive shaft, and the shaft 10 extends through an opening 12 in a housing 14 through a bearing 16. The end of the shaft 10 is removably secured to a fly wheel 18, for example by a nut 20 threaded to the shaft and forcing the fly wheel 18 against a shoulder 22. A rim 24 extends from the fly wheel 18 toward the support member 14, and a permanently magnetized magnet 26 is embedded in the rim 24, the magnet 26 protruding inwardly from the rim toward the shaft 10.

An ignition coil 28 is mounted on the support member 14 adjacent to the rim 24 of the fly wheel 18, and the coil 28 is provided with a ferromagnetic core 30 which confronts the orbit of the magnet 26 and primary and secondary windings. The support member 14 serves as an electrical ground, and one end of the primary winding of the coil 28 is connected thereto. The other end of the primary winding is connected to one of two breaker contacts 32 or 34, the other contact being connected to the support member 14. The secondary winding of the coil 28 has one end connected to a spark plug 36 through an opening 38 in the support member 14, and the other end connected to the support member 14. The breaker contacts 32 and 34 are opened by a cam 40 secured to the shaft 10 which abuts the movable arm of the breaker contacts 32 and 34. A capacitor 42 is connected across the contacts 32 and 34. A cover 43 is secured to the support plate 14 and extends over the fly wheel 18.

For each revolution of the fly wheel 18, the magnet 26 sets up a current in the shorted primary of the coil 28, and the breaker points 32 and 34 open at the precise moment to create a pulse in the secondary winding of the coil of sufficient amplitude to actuate the spark plug 36.

A pickup coil 44 for the tachometer is also mounted on the support member 14 confronting the orbit of the magnet 26. As indicated in FIGURE 1, the pickup coil 44 is disposed within the rim 24 of the fly wheel 18. The pickup coil 44 has a ferromagnetic core formed by a bolt 46 which threadedly engages a nut 48. A bobbin 50 is secured between the bolt 46 and nut 48, and a coil of wire 52 is disposed about the bobbin. The coil 52 is connected in series with a meter 54, a variable resistor 56, and a diode 58. The meter 54 and potentiometer 56 form a voltmeter which responds to the magnitude of the pulse generated in the pickup coil 44. The magnitude of the pulses generated in the pickup coil 44 is proportional to the rotational speed of the magnet 26.

FIGURE 5 illustrates the time potential relationship of the electrical signal developed in the pickup coil 44. Each of the cycles illustrated represents one revolution of the fly wheel 18. The rectifier 58 prevents the negative portions of each of these cycles from passing through the meter 54, and, therefore, permits the meter to respond only to the average value of the positive portions of the cycles.

Figure 3:
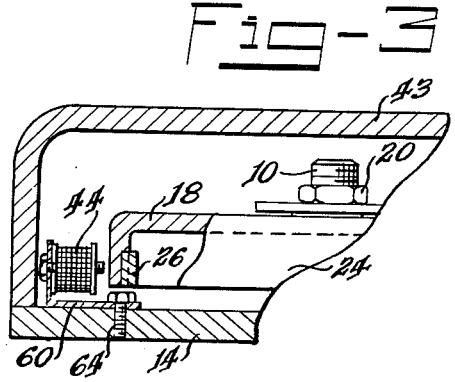
FIGURE 3 is a fragmentary view showing a modification of the tachometer illustrated in FIGURE 1.

As indicated in FIGURE 3, the pickup coil 44 need not be mounted between the shaft and the rim 24 of the fly wheel 18, but may be mounted within the cover 43 exterior to the rim 24 with the core of the coil 44 confronting the rim. A flexible strap 60 mounted between the nut 48 and a second nut 62 of the pickup coil 44 is employed to mount the pickup coil to a bolt 64 threaded into the support member 14. The strap 60 may be a perforated strap which may be bent into the desired position for this purpose. As indicated in FIGURE 1, the magnet 26 protrudes inwardly from the rim 24 of the fly wheel 18, and in the event the fly wheel 18 is constructed of magnetic materials, such as cast iron, the pickup coil 44 may not be mounted exterior to the rim 24, as in FIGURE 3, since the rim 24 will shield the pickup coil from the magnet.

FIGURE 4 illustrates in elevation the distributor magneto of a modified type of internal combustion motor with the pickup coil 44 mounted thereto to respond to each cycle of the magneto. The magneto is designated 66 and is coupled to the drive shaft of the motor through a shaft 68. Electrical connectors 70 come from the magneto casing to connect it with the other portions of the ignition system. Such magnetos have rotating magnets within a housing 71, and the pickup coil 44 is effective to generate a pulse in the manner indicated above for each rotation of the shaft 68 when mounted adjacent to the exterior of the housing 71.

Because of mechanical unbalance, the motor has a vibration period which corresponds to its rotation rate. The tachometer may, therefore, be calibrated by placing a reed 72, which is known to vibrate at a particular frequency, on some portion of the motor structure, such as the cover 43 as indicated in FIGURE 1. The speed of the motor is then adjusted to cause the reed to vibrate with maximum amplitude, and with the motor operating at this speed, the variable resistor 56 is adjusted to cause the meter 54 to indicate the resonant frequency of the reed 72. In this manner, the tachometer may be employed with and calibrated to virtually any motor.

FIGURE 7 illustrates a tachometer constructed according to the present invention applied to two magneto-type internal combustion engines. Two pickup coils 72 and 74 are mounted adjacent the orbit of the magnet employed in the magneto of the two motors, respectively. The pickup coil 72 is connected in a series circuit with a meter 76, a rectifier 78, and a variable potentiometer 80. The pickup coil 74 is also connected in a series circuit with the meter 76, a rectifier 82, and variable potentiometer 84. A three position switch has a pole terminal 86 connected to the junction between the pickup coils 72 and 74. One of the three stationary terminals of the switch is left unconnected, and the other two stationary terminals 88 and 90 are connected to the junction between the rectifier 82 and potentiometer 84, and rectifier 78 and potentiometer 80, respectively.

When the switch is connected with its pole terminal to the unconnected stationary terminal, the potentials generated by the pickup coil 72 buck those generated by the pickup coil 74, and the meter 76 indicates the difference between the two potentials. In this manner, the speed of the motors associated with the pickup coils 72 and 74 may be adjusted to bring them into synchronism. When the motors are rotating at approximately the same frequency, the meter 76 will hunt, and the rate at which the meter hunts is an indication of the difference in the rotation rates of the two motors. When the pole terminal 86 is connected to the stationary terminal 90, the potentials generated by the pickup coil 72 are short circuited, and the meter 76 indicates the rotation rate of the motor associated with the pickup coil 74. In like manner, connection of the pole terminal 86 with the pole 88 indicates the rotation rate of the motor associated with the pickup coil 72.

From the foregoing disclosure, many additional advantages of the present invention and modifications thereof will be suggested to those skilled in the art. It is, therefore, intended that the scope of the present invention be not limited by the foregoing disclosure, but rather only by the appended claims.

The invention claimed is:

1. The combination of a tachometer and two internal combustion engines having separate ignition systems, each of said ignition system having a magneto with a revolving magnet and a coil positioned adjacent thereto, wherein the tachometer comprises two pickup coils having interconnected first terminals and second terminals, means mounting one of said coils adjacent the magneto of one motor and within the magnetic field of the revolving magnet of said magneto, and means mounting the other coil adjacent to the magneto of the other motor and within the magnetic field of the revolving magnet of the magneto of said other motor, a first series circuit including the first pickup coil, a current responsive meter and a first diode, and a second series circuit including the second pickup coil, the meter and a second diode, the first and second diodes being polarized to pass currents in opposite directions through the meter.

2. The combination of a tachometer and two internal combustion engines having separate ignition systems, each of said ignition systems having a magneto with a revolving magnet and a coil positioned adjacent thereto, wherein the tachometer comprises two pickup coils having interconnected first terminals and second terminals, means mounting one of said coils adjacent the magneto of one motor and within the magnetic field of the revolving magnet of said magneto, and means mounting the other coil adjacent to the magneto of the other motor and within the magnetic field of the revolving magnet of the magneto of said other motor, a first series circuit including the first pickup coil, a current responsive meter and a first diode, a second series circuit including the second pickup coil, the meter and a second diode, the first and second diodes being polarized to pass currents in opposite directions through the meter, and a three position switch having a pole terminal connected to the interconnected terminals of the pickup coils and two stationary terminals, one of the stationary terminals being connected to the second terminal of each coil, whereby the meter will selectively indicate the speed of each motor individually or the difference in the speed of the two motors.

3. A tachometer for two internal combustion engines having separate ignition systems with magnetos comprising two pickup coils having interconnected first terminals and second terminals, means mounting one of said coils adjacent the magneto of one motor and the other coil adjacent to the magneto of the other motor, the coils being within the magnetic fields of their respective magnetos, a first series circuit including the first pickup coil, a current responsive meter, a first variable resistor, and a first diode, a second series cricuit including the second pickup coil, the meter, a second variable resistor, and a second diode, the first and second diodes being polarized to pass currents in opposite directions through the meter.

4. A tachometer for two internal combustion engines having separate ignition systems comprising means coupled to the ignition system of the first engine to generate electric pulses at a rate porportional to the pulse rate of the first ignition system, means coupled to the ignition system of the second engine to generate electric pulses at a rate proportional to the pulse rate of the second ignition system, a first series circuit including the first pulse generating means, a current responsive meter and a diode, and a second series circuit including the second pulse generating means, the current responsive meter, and a diode polarized to pass current through the meter in the opposite direction from the first diode.

5. The combination of a tachometer and an internal combustion engine, said engine having an ignition system with a magneto, the magneto having a rotatable magnet and a coil positioned adjacent to the rotatable magnet for generating the ignition pulses, and said tachometer comprising a second coil positioned adjacent to the magnet and within the magnetic field of said magnet, whereby an electric pulse is generated in the second coil responsive to each rotation of the magnet, and means for indicating the number of electrical pulses per unit of time generated in the second coil.

6. The combination of a tachometer and an internal combustion engine comprising the elements of claim 5 wherein the means for indicating the number of electrical pulses generated in the second coil per unit of time comprises a series circuit including the second coil, a rectifier, and a voltmeter.

7. The combination of a tachometer and an internal combustion engine, said engine having an ignition system with a magneto, the magneto having a fly wheel and a magnet mounted on the fly wheel for rotation in an orbit, and a coil positioned adjacent to the fly wheel confronting the orbit of the magnet for generating the ignition pulses, and said tachometer comprising a second coil positioned adjacent to the fly wheel confronting the orbit of the magnet and within the magnet field of said magnet when said magnet is located in one portion of its orbit, whereby an electrical pulse is generated in the second coil for each passing of the magnet, and means for indicating the number of electrical pulses generated in the second coil per unit of time.

8. The combination of a tachometer and an internal combustion engine comprising the elements of claim 7 wherein the means for indicating the number of electrical pulses generated in the second coil comprises a series circuit including the second coil, a diode, and a current responsive meter.

References Cited in the file of this patent

UNITED STATES PATENTS

| | | |
|---|---|---|
| 591,162 | Fiske | Oct. 5, 1897 |
| 1,686,638 | Pierce | Oct. 9, 1928 |
| 1,964,141 | Rhodes et al. | June 26, 1934 |
| 2,060,721 | Bird | Nov. 10, 1936 |
| 2,248,504 | Kenny | July 8, 1941 |
| 2,301,115 | Gilbert | Nov. 3, 1942 |
| 2,559,849 | Covert | July 10, 1951 |
| 2,785,215 | Yetter | Mar. 12, 1957 |
| 2,863,114 | Murphy | Dec. 2, 1958 |
| 2,905,890 | Phelps | Sept. 22, 1959 |